(12) United States Patent
Chang et al.

(10) Patent No.: US 12,547,008 B1
(45) Date of Patent: Feb. 10, 2026

(54) WATER INGRESS PROTECTION FOR ELECTRONIC DEVICE HINGE

(71) Applicant: Meta Platforms Technologies, LLC, Menlo Park, CA (US)

(72) Inventors: Royce Dean Chang, Bothell, WA (US); Aaron Bobuk, Bellevue, WA (US); Brett W. Selvig, Portland, OR (US); Samuel Adam Heard, Albany, CA (US); Adam Petri, Seattle, WA (US); Joseph Park, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 297 days.

(21) Appl. No.: 18/488,327

(22) Filed: Oct. 17, 2023

Related U.S. Application Data

(60) Provisional application No. 63/429,044, filed on Nov. 30, 2022.

(51) Int. Cl.
*G02B 27/01* (2006.01)
*G02C 5/22* (2006.01)
*H05K 5/06* (2006.01)

(52) U.S. Cl.
CPC ........... *G02B 27/0176* (2013.01); *G02C 5/22* (2013.01); *H05K 5/061* (2013.01); *G02B 2027/0154* (2013.01); *G02B 2027/0178* (2013.01)

(58) Field of Classification Search
CPC ........ G02B 27/0176; G02B 2027/0154; G02B 2027/0178; G02C 5/22; H05K 5/061
USPC ........................................... 359/630; 345/7–9
See application file for complete search history.

(56) References Cited

FOREIGN PATENT DOCUMENTS

WO    WO-2022262847 A1 * 12/2022 ........... G02C 5/2254

* cited by examiner

*Primary Examiner* — William Choi
(74) *Attorney, Agent, or Firm* — Morgan, Lewis & Bockius LLP

(57) ABSTRACT

A head-mounted device may include a frame having an inner peripheral edge defined within a peripheral region of the frame, a temple extending from the peripheral region of the frame, and a hinge assembly coupling the temple to the frame. The head-mounted device may include a wiper gasket that is configured to engage a peripheral surface of a stationary section of the hinge assembly and extend around the inner peripheral edge of the frame to seal against ingress of water and dust. The stationary section may be coupled to the frame via one or more internal mounts such that force applied on the frame is transferred to the internal mounts, thereby minimizing forces experienced by the wiper gasket.

20 Claims, 6 Drawing Sheets

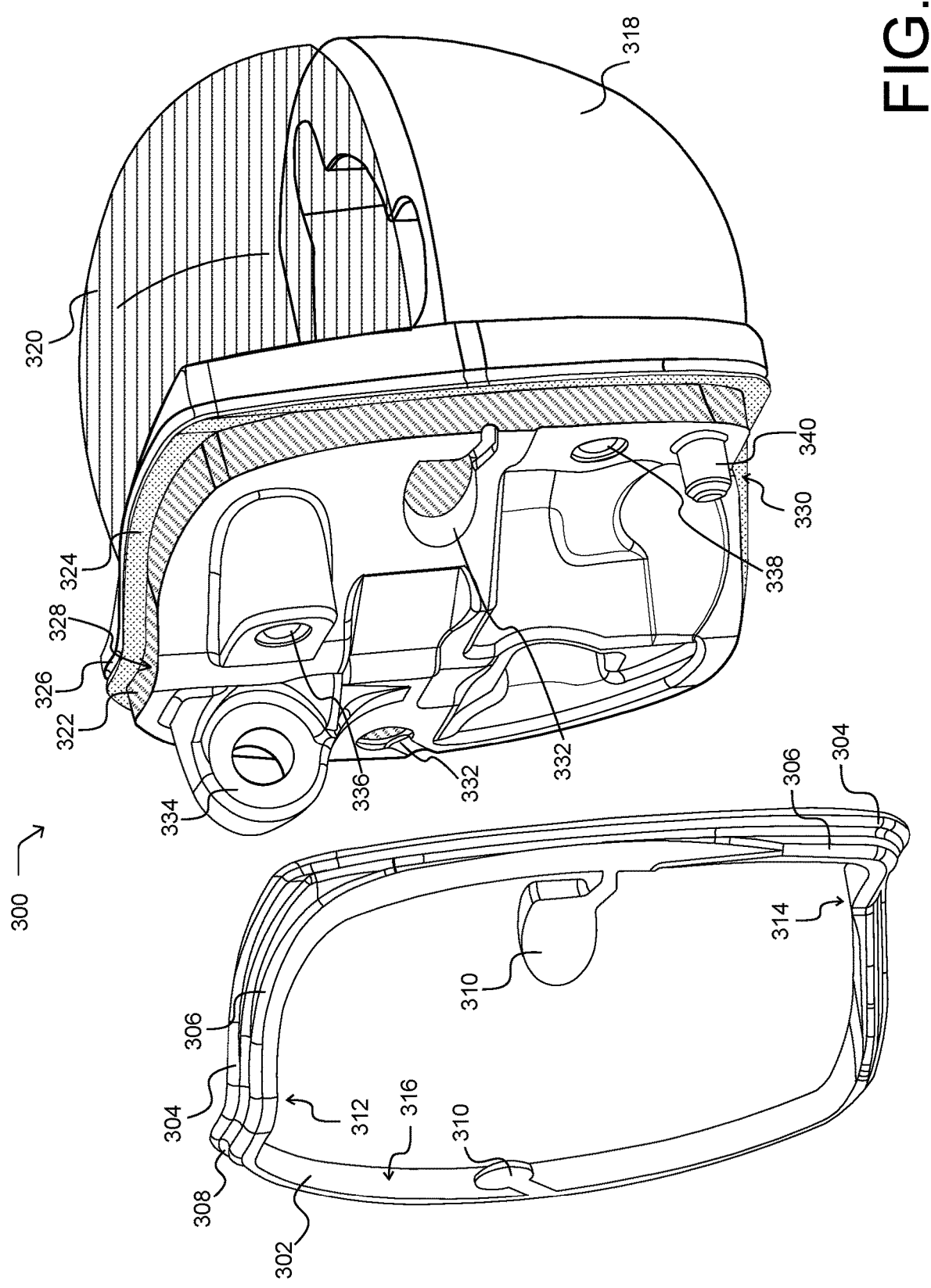

WATER INGRESS PROTECTION FOR ELECTRONIC DEVICE HINGE

RELATED APPLICATIONS

This Application claims the benefit of, and priority to, U.S. Provisional Application No. 63/429,044, filed on Nov. 30, 2022, which is incorporated herein by reference.

BACKGROUND

Extended reality (e.g., virtual reality, augmented reality, mixed reality, etc.) devices are gaining in popularity for use in a growing number of activities. For example, extended reality headsets may provide users with enhanced entertainment experiences, interactions with people in computer-generated simulations of three-dimensional environments, or views of images superimposed on real-world views.

Extended reality devices include numerous optical and electronic systems that can be damaged by moisture or contaminants and are, therefore, often sealed with an adhesive to prevent moisture and contaminants from getting inside a housing of the devices. The use of adhesive to seal the housing makes it difficult or impossible to service these devices. Also, the complex geometries of many these devices makes it difficult to get a consistent and uniform bead of liquid adhesive around a periphery of the housing, which can compromise the integrity of the seal. The integrity of the seal can be further compromised if the housing is repeatedly subjected to stresses. As such, traditional electronic devices which include portions sealed by adhesive may not be well suited for extended reality headsets and other wearable electronic devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a perspective view of the example hinge assembly of FIGS. 1 and 3, with the wiper gasket shown removed from a stationary section of the example hinge assembly, in accordance with an example of the present disclosure.

DETAILED DESCRIPTION

Overview

Figure 1:
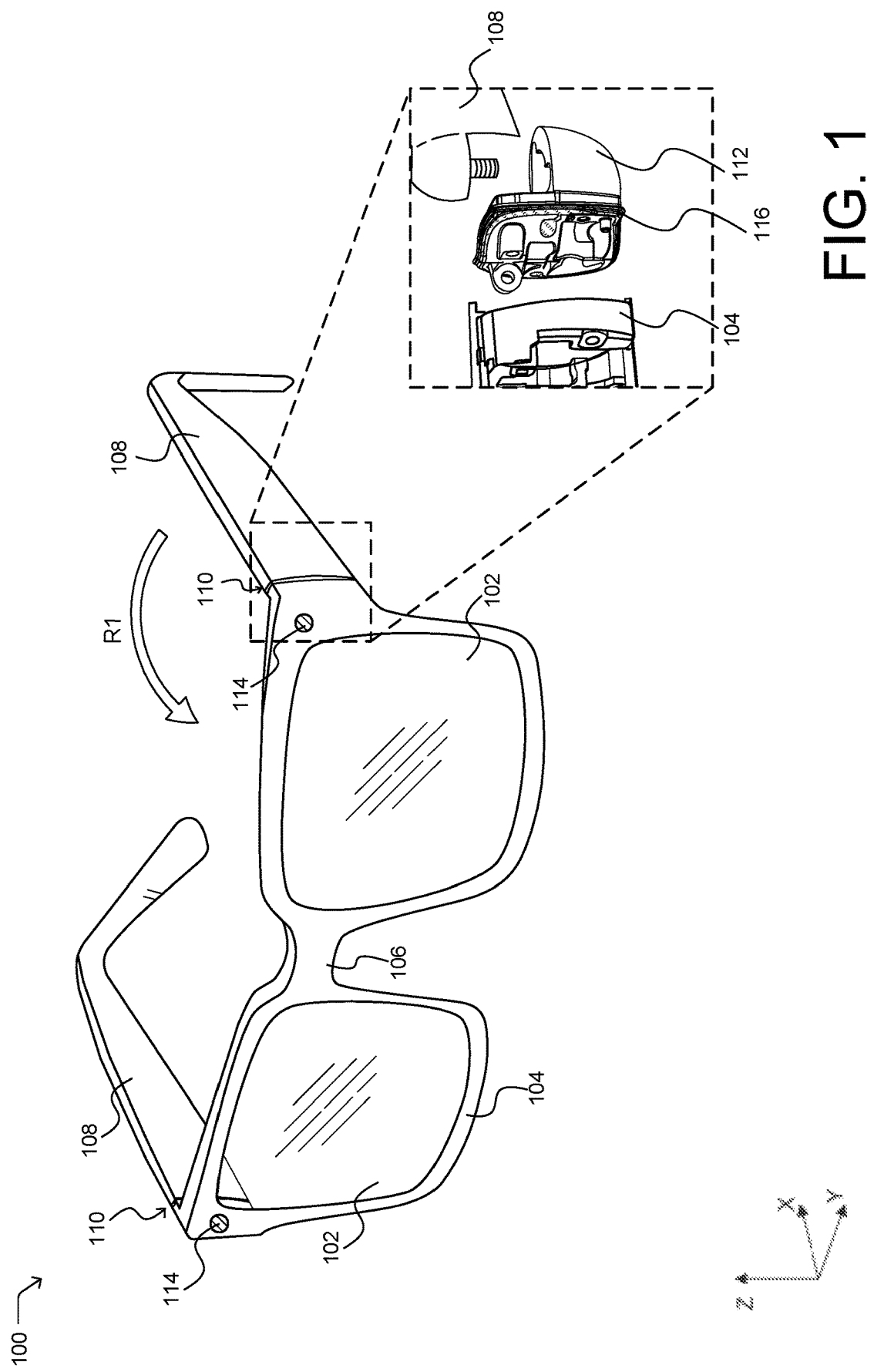
FIG. 1 is a perspective view of an example extended reality device including an example hinge assembly, shown in the excerpted view, in accordance with an example of the present disclosure.

This application relates techniques for sealing portions of wearable electronic devices, such as head-mounted devices (e.g., extended reality devices). According to at least one example, a head-mounted device may include a hollow frame having an inner peripheral edge defined within a peripheral region of the hollow frame, a temple extending from the peripheral region of the hollow frame, and a hinge assembly coupling the temple to the hollow frame. The hinge assembly may include a stationary section coupled to the hollow frame and a rotary section coupled to the temple and rotatable with respect to the stationary section about a rotational axis. The head-mounted device may also include a wiper gasket that is configured to engage a peripheral surface of the stationary section and extend around the inner peripheral edge of the hollow frame to seal the head mounted device and minimize the entry of moisture and/or dust from entering the frame. Additionally, the stationary section may be coupled to the frame via one or more internal mounts such that force applied to the frame or temples when donning and doffing the head-mounted device, adjusting a size of the head-mounted device, or when the head-mounted device is dropped, is transferred to the one or more internal mounts, thereby minimizing forces experienced by the wiper gasket. The wiper gasket may have a stepped profile including any number of steps, protrusions, and/or ribs. In some examples, the wiper gasket may have a stepped profile including a first step and a second step where the first step is configured to engage the inner peripheral edge of the hollow frame so that a seal is formed. In some examples, the second step may gradually taper in a middle portion of the wiper gasket.

In some examples, the inner peripheral edge of the frame may include a recessed portion configured to receive a portion of the wiper gasket. For example, the recessed portion may be shaped to receive at least a part of the first step of the wiper gasket in order to facilitate proper or accurate placement of the wiper gasket. In some examples, the wiper gasket may engage a peripheral surface of the stationary section at a first mounting region and a second mounting region substantially perpendicular to the first mounting region. In at least one example, the wiper gasket may be made in whole or in part of a silicone rubber having a Shore A durometer measurement between 40 A to 70 A.

In some examples, the wiper gasket may have a non-planer profile where a first portion of the wiper gasket is configured to extend around the inner edge of the frame in or on a first plane and a second portion opposite the first portion is configured to extend around the inner edge of the frame in on a second plane which is parallel to the first plane and spaced closer to the temple than the first plane. In some examples, the wiper gasket may include a protrusion or tab that extends from a side of the wiper gasket and is configured to direct placement of the wiper gasket between a first component (e.g., a frame) and the second component (e.g., stationary section of the hinge assembly).

Features from any of the above-mentioned examples may be used in combination with one another in accordance with the general principles described herein. These and other examples, features, and advantages will be more fully understood upon reading the following detailed description in conjunction with the accompanying drawings and claims.

FIG. 1 is a perspective view of a head-mounted device 100 according to some examples. The term "head-mounted device" as used herein, generally refers to a type or form of display device or system that is won on or about a user's head and displays visual content to the user. Head-mounted devices may display content in any suitable manner, including via a screen (e.g., an LCD or LED screen), a projector, a cathode ray tube, one or more lasers, an optical mixer, etc. Head-mounted devices may display content in one more of various media formats. For example, a head-mounted device may display video, photos, and/or computer-generated images (CGI). Head-mounted device 100 may include a housing surrounding various components of head-mounted device 100 including various electronic components including display components as described above.

Head-mounted devices may provide diverse and distinctive virtual reality experiences (i.e., they may display computer-generated or pre-recorded content), while other head-mounted devices may provide real-world experiences (i.e., they may display live images from the physical world. Head-mounted devices may also provide any mixture of live and virtual content. For example, virtual content may be projected on to lenses of the head-mounted device so as to appear overlaid on a user's view of the physical world, which may result in augmented reality or mixed reality experiences. Head-mounted devices may be configured to be mounted to a user's head in a number of ways. By way of example and not limitation, head-mounted devices may include glasses, goggles, visors, helmets, hats, or other headwear.

Head-mounted device 100 may include one or more lenses 102, such as right-and-left-eye lenses 102, secured in a frame 104 that surrounds lenses 102. Lenses 102 may be transparent or semi-transparent, allowing a wearer to view their external environment through the lenses 102. In some examples, lenses 102 may have a customized optical power to provide vision correction to the user. In various examples, lenses 102 may also function as displays, such as near-eye displays, that include or utilize a display system (e.g., a projection display system) to present media to a user. Examples of media presented by lenses 102 include one or more images, a series of images (e.g., video), or some combination thereof. Lenses 102 may be configured to operate as augmented-reality displays such that a user can see media projected in their field of view while simultaneously having a view of at least a portion of the real-world environment. In some examples, lenses 102 may be modified to also operate as virtual-reality displays, mixed-reality displays, or some combination thereof. Accordingly, in some examples, lenses 102 may augment or replace views of a physical, real-world environment with computer-generated elements (e.g., images, video, etc.). In some examples, frame 104 may be a frame of eye-wear glasses that may secure lenses 102 in place on the head of a user. A bridge 106 of frame 104 between lenses 102 may be sized to fit over and rest on the top of the bridge of the user's nose. A pair of temples 108 may be coupled to the frame 104 and configured to rest on, behind, and/or wrap at least partially around ears of the user. The frame 104 and/or temples 108 may be at least partially hollow to accommodate electronic components (e.g., processors, memory, radios, antennas, projectors or other display components, sensors, batteries or other energy storage devices, printed circuit boards, integrated circuits, wires, cables, and/or other components).

In some examples, the frame 104 may include one or more sensors 114 (e.g., audio sensors, image sensors, position sensors, accelerometers, gyroscopes, magnetometers, other suitable types of sensors, etc.) disposed at various locations throughout the frame 104 and/or temples 108. The one or more sensors 114 may be associated with one or more electrical and/or optical conductors disposed within the temple 108 and/or frame 104. The one or more sensors 114 may represent one or more of a variety of different sensing mechanisms.

In at least one example, head-mounted device 100 may include a hinge 110 rotatably coupling each of a pair of temples 108 to frame 104. For example, as shown, hinges 110 may couple respective temples 108 to right and left peripheral regions of frame 104 (right and left, as used herein, correspond to right and left from the perspective of a wearer of the head-mounted device 100).

Each temple 108 may be rotated via the corresponding hinge 110 between an open position in which temple 108 extends generally perpendicular to frame 104, and a closed position in which temple 108 is rotated inward such that it is aligned generally parallel with the frame 104. For example, as shown in FIG. 1, a left-sided temple 108 may be rotated about a left-side hinge 110 in rotational direction R1 from the open position to the closed position. Temples 108 may be oriented in the open position to allow head-mounted device 100 to be securely worn on a user's head. Additionally, temples 108 may be oriented in the closed position to minimize the profile of head-mounted device 100, enabling compact storage of head-mounted device 100 and minimizing potential damage to temples 108. As will be discussed, hinges 110 may hold temples 108 in a selected position, such as open or closed position, until forced into a new position by, for example, a user.

According to some examples, hinge 110 may be associated with a hinge assembly. The hinge assembly is shown in the enlarged detail view shown in the broken line rectangle at the bottom right in FIG. 1 and may include a stationary section 112 and a rotary section (as described further in relation to FIGS. 2-6). The enlarged detail view depicts a portion of an outer housing of the frame 104 omitted to expose internal components of the frame 104, wiper gasket 116, and hinge assembly. A wiper gasket 116 may be positioned between the stationary section 112 and the frame 104 so prevent or limit ingress of moisture and/or dust to the frame. One or more additional seals or gaskets (now shown) may be provided in the temples 108 to prevent or limit ingress of moisture and/or dust to the temple 108. The hinge assembly enables the temples 108 to be rotated outward from each other (i.e., temples 108 may be rotationally over-extended) by a user to provide additional space between the pair of temples 108, facilitating donning and/or doffing of head-mounted device 100 on the wearer's head. For example, left-side temple 108 may be rotated outwardly about left-side hinge 110 in a direction opposite rotational direction R1 and right-side temple 108 may be rotated outwardly as well to provide an increased gap between the temples 108 so as to accommodate the user's head during mounting and removal. Subsequently, as the user relaxes an applied outward force pushing temples 108 further apart, temples 108 may be biased by hinge assemblies of the hinge 110 back toward the open positions illustrated in FIG. 1 to securely mount and hold head-mounted device 100 on the user's head. In some examples, the space between left-and-right side temples 108 when the temples are each in the open position may be less than that required to accommodate the heads of some or all users. As such, left-and-right-side temples 108 may be rotationally over-extended beyond their open positions when worn. In these examples, left- and right-side hinge assemblies may apply biasing forces directed toward the open positions such that temples 108 are biased rotationally inward against opposite sides of the user's head. Thus, head-mounted device 100 may be securely held on the heads of users due to the over-extended states of the hinge assemblies during wear.

Head-mounted device 100 may additionally or alternatively include various other features and/or components, including for example, directional speakers to provide audio to a user, bone conduction transducers for providing sound signals to a user via vibrational bone conduction in an auditory region of the user's head, tracking and/or recording cameras, passive and/or active front and/or rear facing cameras to capture images from the user's environment, eye tracking cameras, ambient light, night vision, and/or thermal image sensors, multimode connectivity antennas for wireless communication, audio microphones for capturing sound in the user's environment, lights for illuminating a user's face and/or the environment, inertial, haptic, environmental, and/or health monitoring sensors, and/or any other suitable components, without limitation. Any or all of these components may be disposed within or on the frame 104 and/or the temples 108.

Figure 2:
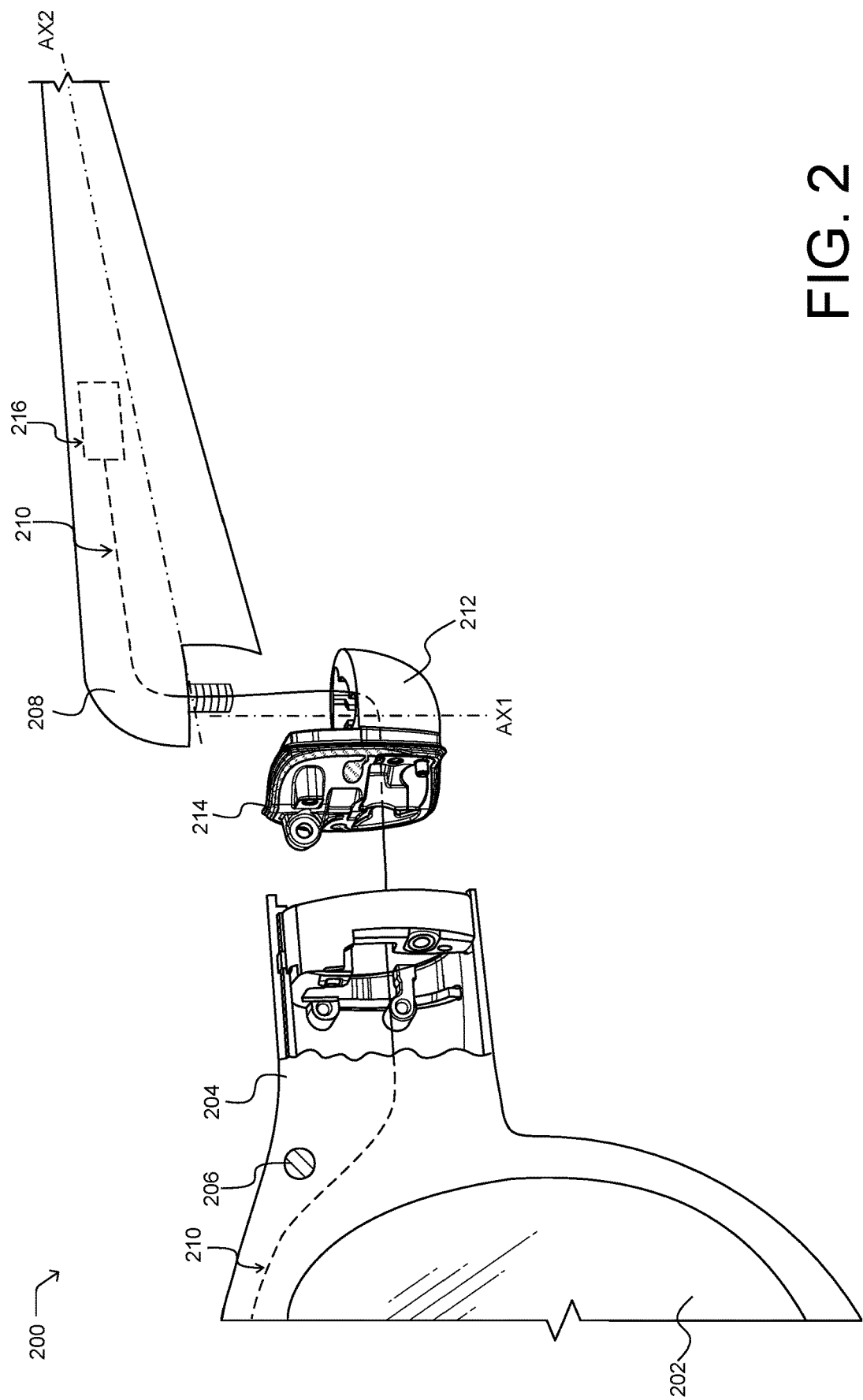
FIG. 2 is an exploded view of the example hinge assembly of FIG. 1 including a wiper gasket in accordance with an example of the present disclosure.

FIG. 2 is a perspective view of an example head-mounted device 200 including a hinge assembly in accordance with an example of the present disclosure. The head-mounted device in FIG. 2 may include, for example, a lens 202, frame 204, sensor 206, temple 208, a wiring passage 210, one or more electronic components 216, a hinge assembly including a stationary section 212, and a wiper gasket 214. FIG. 2 depicts a portion of an outer housing of the frame 204 omitted to expose internal components of the frame 204.

The wiring passage 210 may provide passage for conductors (e.g., optical fibers, wires, cables, traces, pins, or other electrical thermal and/or data conductors that pass through the hinge assembly) that connect electronic components 216 (batteries, processors, memory radio, antenna, sensors, ports, storage media, etc.) in the temple 208 to electronic components in the frame 204 and/or display lens(es) mounted to the frame 204. In some examples, the wiring passage 210 may extend along or through a rotational axis (AX1) of the hinge assembly (through one or more openings defined within the stationary section 212 and rotatory section (shown in FIG. 6)). In some examples, the wiring passage 210 may extend along all or a portion of a longitudinal axis (AX2) of the temple 208.

FIG. 3 is a perspective view of a hinge assembly 300 including a wiper gasket 302 when it is removed from a stationary section 318 of the hinge assembly 300. The hinge assembly 300 shown in this figure is configured to be used, for example, in a hinge 110 that is coupled to a left side of frame 104 (i.e., the side closes to the user's left eye) and to a temple 108 that is rotatable in rotational direction R1 from an open position to a closed position, as illustrated in FIG. 1. A hinge assembly for use on the right side of frame 104 may have the same or similar configuration with components mirroring those in hinge assembly 300.

Wiper gasket 302 may be arranged between a peripheral portion of frame 104 and stationary section 318 of hinge assembly 300. For example, wiper gasket 302 may be configured to engage a peripheral surface of stationary section 318 and extend around an inner peripheral edge of frame 104 in order to provide ingress protection from water and/or dust. In some examples, the wiper gasket 302 may be configured to have an ingress protection (IP) rating of IP 64, IP 65, IP 66, IP 67, or IP 68. In some examples, the wiper gasket 302 may be coupled to a peripheral surface of stationary section 318 and/or an inner peripheral edge of frame 104 using, for example, tape, glue, epoxy, chemical bonding, overmolding, or the like. In some examples, the wiper gasket 302 may be held in place between the stationary section 318 and frame 104 at least in part by being sandwiched between one or more portions of the inner peripheral edge of the frame 104 and the peripheral surface of stationary section 318. In some examples, the wiper gasket may transition to a compression gasket in order to leave a clearance for one or more screws, bolts, pins, rivets, or other fastening means for coupling or connecting one or more portions of the hinge assembly 300, the frame 104, and/or the temple 108.

In some examples, wiper gasket 302 may be manufactured using a molding process. For example, wiper gasket 302 may be manufactured using a rotary two-shot injection molding process, an overmolding process, multi-shot processes, or using insert molding techniques by methods that are well known to those skilled in the art. Furthermore, wiper gasket 302 may be produced using extrusion, compression molding, machining, casting, 3-D printing, a dispensing process, a form-in-place method, or any other method known in the art.

In some examples, the wiper gasket 302 is formed from an elastomeric material including, but not limited to, silicone rubber (e.g., methyl vinyl silicone rubber, fluorinated silicone rubber, or phenyl silicone rubber, etc.) liquid silicone rubber (LSR) (e.g., Silastic LTC 9400-50, Silastic RBL-9200-60, Silastic RBL-9200-50, Dow Corning QP1-250 LSR, Dow Corning QP1-50 LSR, Dow Corning C6-750 LSR, Silastic Q7-4850 BioMedical Grade LSR, Silastic Q7-7850 BioMedical Grade LSR, etc.), thermoplastic elastomer (TPE), thermoplastic vulcanizates (TPV), as well as other thermoplastics and silicones, including combinations of thermoplastics and silicones. In some examples, the wiper gasket 302 may be formed from a material with a Shore A durometer measurement between about 40 A to 70 A.

In some examples, the wiper gasket 302 may have a stepped profile. In some examples, the wiper gasket may include any number of ridges, ribs, protrusions, and/or steps. For example, wiper gasket 302 may have a first step 304, a second step 306 proximate the first step, and concave portion 308 between the first step 304 and the second step 306. The first step 304 may be configured to continuously engage an inner surface of frame 104. For example, the first step 304 may be configured to engage the inner peripheral edge of a frame (e.g., a hollow or partially hollow frame) such that the first step 304 forms a seal and moisture and/or dust is prevented from entering the frame. In some examples, the first step 304 may create a watertight, airtight, and/or hermetic seal. The wiper gasket 302 may enable various electronic components of head-mounted device 100 to be incorporated into temple 108 and/or frame 104 while preventing moisture and/or dust from entering frame 104 and/or temple 108 and damaging the various electronic components. For example, frame 104 may include cables (e.g., optical cables, wires, fibers, traces, pins, or other electrical thermal and/or data conductors) and/or electronic components (e.g., components associated with directional speakers, bone conduction transducers for providing sound signals to a user via vibrational bone conduction in an auditory region of the user's head, tracking and/or recording cameras, passive and/or active front and/or rear facing cameras to capture images from the user's environment, eye tracking cameras, ambient light, night vision, and/or thermal image sensors, multimode connectivity antennas for wireless communication, audio microphones for capturing sound in the user's environment, lights for illuminating a user's environment, inertial, haptic, environmental, and/or health monitoring sensors, and/or any other suitable components, without limitation) to be incorporated into frame 104 and/or temple 108.

In some examples, the second step 306 may extend around a perimeter of wiper gasket 302 and act at least in part as a second seal. In some examples, the second step 306 may extend partially around a perimeter of the wiper gasket 302. For example, the second step 306 may extend around the wiper gasket 302 in a non-uniform manner such that a first portion 312 of the wiper gasket 302 and a second portion 314 opposite the first portion of the wiper gasket 302 are configured to include a second step 306 and not a middle portion connecting the first portion 312 and second portion 314. In some examples, the second step 306 may gradually taper in the middle portion between the first portion and the second portion of the wiper gasket 302. In some examples, the second step 306 proximate the first step 304 may be uniformly or non-uniformly spaced (e.g., positioned) from the first step 304. In some examples, wiper gasket 302 may be configured such that one or more portions of the wiper gasket 302 are recessed (e.g., concave). For example, concave portion 308 may be recessed relative to the first step 304 and the second step 306.

In some examples, wiper gasket 302 has a third step (not shown) that is substantially parallel to the first step 304 and is configured to form a second pressure seal. For example, the third step may be configured to continuously engage an inner peripheral edge of frame 104 such that the third step creates a second seal. In some examples, the third step may be substantially parallel to the second step 306 and partially extend around a perimeter of wiper gasket 302. In some examples, the wiper gasket 302 may include any number of steps, protrusions, or ribs that extend from a surface of the wiper gasket and engage the inner peripheral edge of the frame.

The wiper gasket 302 may have a uniform wall thickness or a non-uniform wall thickness throughout. For example, a first portion 312 of the wiper gasket 302 and a second portion 314 opposite the first portion of the wiper gasket 302 may have a thicker wall (e.g., wider or have a larger diameter) than a middle portion connecting the first portion 312 and second portion 314.

In some examples, the wiper gasket 302 may include one or more protrusions 310 that extend from one or more lateral sides 316 of the wiper gasket 302. The one or more protrusions 310 may be configured to fit into and/or around one or more cavities (e.g., cavity 332) formed in stationary section 318. In some examples, the one or more protrusions may be configured to help position the wiper gasket 302 relative to the stationary section 318 and ensuring the wiper gasket 302 does not move out of position during assembly (e.g., preventing the wiper gasket 302 from slipping out of position or getting pinched during assembly). The one or more protrusions 310 may be of various shapes, sizes, depths, and positions depending on the shape, size, depth, and position of the cavity associated with stationary section 318. Though FIG. 3 only portrays two protrusions 310, any number of protrusions may extend in one or more directions from the main body of the wiper gasket 302.

In some examples, the wiper gasket 302 may have a non-planar profile. For example, a first portion 312 of wiper gasket 302 may partially extend in a first direction (e.g., a first longitudinal direction) and a second portion 314 opposite the first portion of wiper gasket 302 may extend in a second direction (e.g., a second longitudinal direction) opposite the first direction. In some examples, a first portion 312 of the wiper gasket may be disposed in a first plane and extend in a first direction and a second portion 314 opposite the first portion may be disposed in a second plane offset from the first plane and extend in a second direction opposite the first direction. In some examples, a first portion 312 of the wiper gasket may be disposed on a first plane that is perpendicular to a longitudinal axis (e.g., AX2 as shown in FIG. 2) of a temple, and a second portion 314 of the wiper gasket may be disposed on a second plane substantially parallel to the first plane.

As shown in FIG. 3, hinge assembly 300 may include a stationary section 318 and a rotary section 320 that is rotatable with respect to stationary section 318 about a rotational axis (see, e.g., rotational axis AX1 in FIG. 2). In some examples, stationary section 318 may be coupled to frame 104 and rotary section 320 may be coupled to a corresponding temple 108. For example, stationary section 318 may be fastened, bonded, and/or otherwise fixedly secured to a peripheral mounting region of frame 104 such that the position and orientation of stationary section 318 is maintained relative to frame 104 during rotation of rotary section 320 and temple 108. In some examples, rotary section 320 may include a rotational mechanism within rotary section 320 that facilitates the rotation of the temple 108 relative to the frame 104. In some examples, the rotary section 320 may be coupled to the temple 108 such that the rotational mechanism enables the rotary section 320 to rotate in conjunction with temple 108. In some examples, rotary section 320 may include a rotary cover and stationary section 318 may include a stationary cover. Rotary cover and stationary cover may house internal components of stationary section 318 and rotary section 320. In some examples, stationary section 318 may be comprised of multiple stationary parts. For example, stationary section 318 may comprise of a stationary cover, a frame mounting region, and portions of an internal assembly (not shown) that include internal components of rotary section 320. In at least one example, stationary cover and rotary cover may have rounded exterior surfaces, such as partial-spherical, partial-ellipsoidal, cylindrical, partial-cylindrical, cuboid, and/or any other geometrical or other suitable shapes that are visible when temple 108 is in a closed position.

In some examples, stationary section 318 may include one or more mounting regions for mounting wiper gasket 302 to stationary section 318. For example, stationary section 318 may include a first mounting region 322 and a second mounting region 324 that is substantially perpendicular to the first mounting region. The first mounting region 322 may be configured to accept lateral sides 316 of the wiper gasket 302. The second mounting region 324 may be configured to accept one or more portions of the wiper gasket 302 that substantially perpendicular to the lateral sides 316. In some examples, the first mounting region 322 may be parallel to a longitudinal axis of temple 208 (see, e.g., AX2 in FIG. 2). In some examples, the second mounting region 324 may be parallel to a rotational axis about which rotary section 320 is rotatable with respect to stationary section 318 (see, e.g., AX1 in FIG. 2). In some examples, stationary section 318 may include a concave region 326 located proximate second mounting region 324. Concave region 326 may be configured to reduce or eliminate the tendency of the wiper gasket to flash during molding or manufacturing.

In some examples, stationary section 318 may include mounting regions that are non-planar. For example, first mounting region 322 and second mounting region 324 may include a first mounting portion 328 disposed in a first plane and a second mounting portion 330 disposed in a second plane substantially parallel to the first plane. In some examples, the first mounting portion 328 may be disposed on a first plane that is perpendicular to a longitudinal axis (e.g., AX2 as shown in FIG. 2) of a temple, and the second mounting portion 330 may be disposed on a second plane substantially parallel to the first plane and offset from the first plane. The wiper gasket is configured to engage the stationary section at the first mounting portion 328 and the second mounting portion 330.

Stationary section 318 may include one or more internal mounts (e.g., internal mounts 334, 336, and 338) configured to couple and secure various parts of a hinge assembly, frame, and temple. The one or more internal mounts may be integrally formed within the stationary section 318 or fixedly coupled to the stationary section 318. In some examples, the one or more internal mounts may be internal to the housing or disposed within a perimeter of the housing of the head-mounted device 100. In some examples, the one or more internal mounts may be associated with an extension arm or extend away from stationary section 318. For example, internal mounts 334 and 336 protrude or extend from stationary section 318. Internal mounts 334, 336, and 338 may have a cylindrical or substantially cylindrical exterior and/or interior surface. Internal mounts 334, 336, and 338 may be configured to accept a fastener, such as a screw, bolt, pin, rivet, or other fastening means for connecting hinge assembly 300, frame 104, and/or temple 108. In some examples, the stationary section 318 may be coupled to the hinge assembly and/or frame using structural adhesive. In some examples, the stationary section 318 may be coupled to the hinge assembly and/or frame using mechanical fasteners and/or structural adhesive.

In some examples, stationary section 318 may include any number of stationary guides and/or alignment pins. For example, stationary section 318 may include a stationary guide 340 (or alignment pin) configured to ensure that the stationary section 318 is properly aligned with a frame (e.g., frame 204) during assembly. For example, the stationary guide 340 may be configured to insert into and/or align with a stationary guide opening (e.g., stationary guide opening 418 shown in FIGS. 4A and 4B) associated with a frame. In some examples, one or more internal mounts may act at least in part as a stationary guide and/or alignment pin. For example, internal mount 334 may act at least in part as a stationary guide and/or alignment pin and ensure that stationary section 318 is properly inserted and/or aligned with the frame during assembly.

Figure 4B:
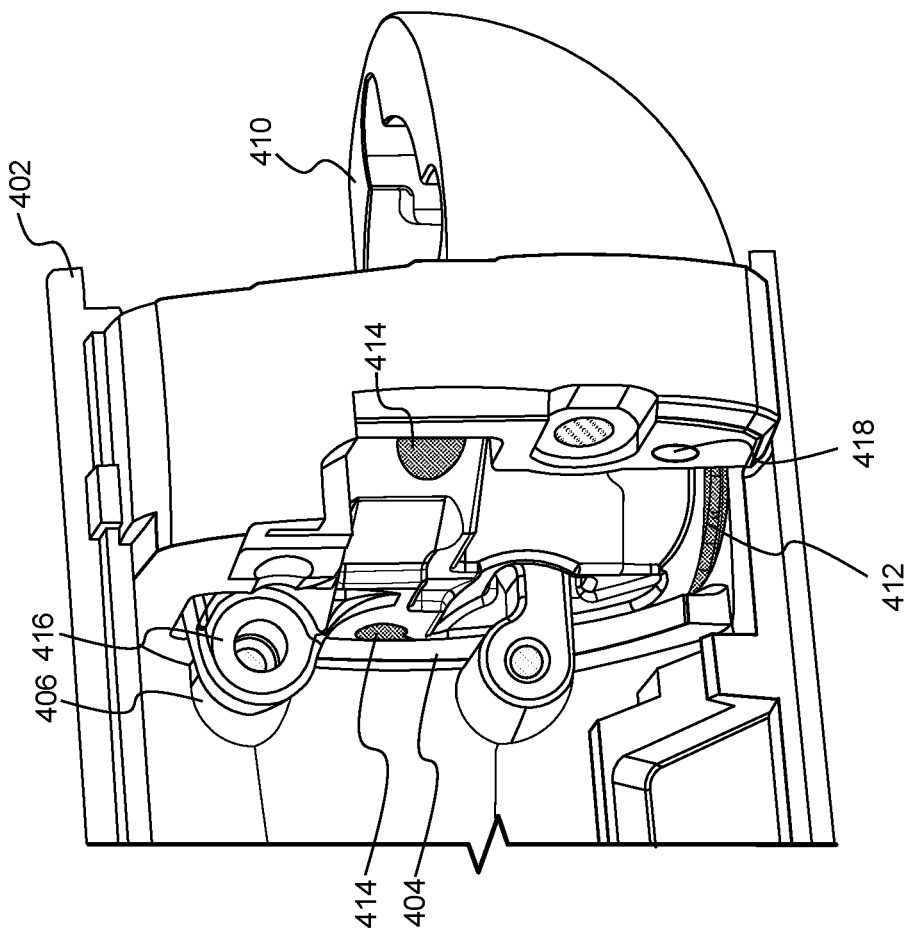
FIG. 4B illustrates a stationary section of the hinge assembly positioned in the peripheral region of the frame of FIG. 4A, in accordance with an example of the present disclosure.
Figure 4A:
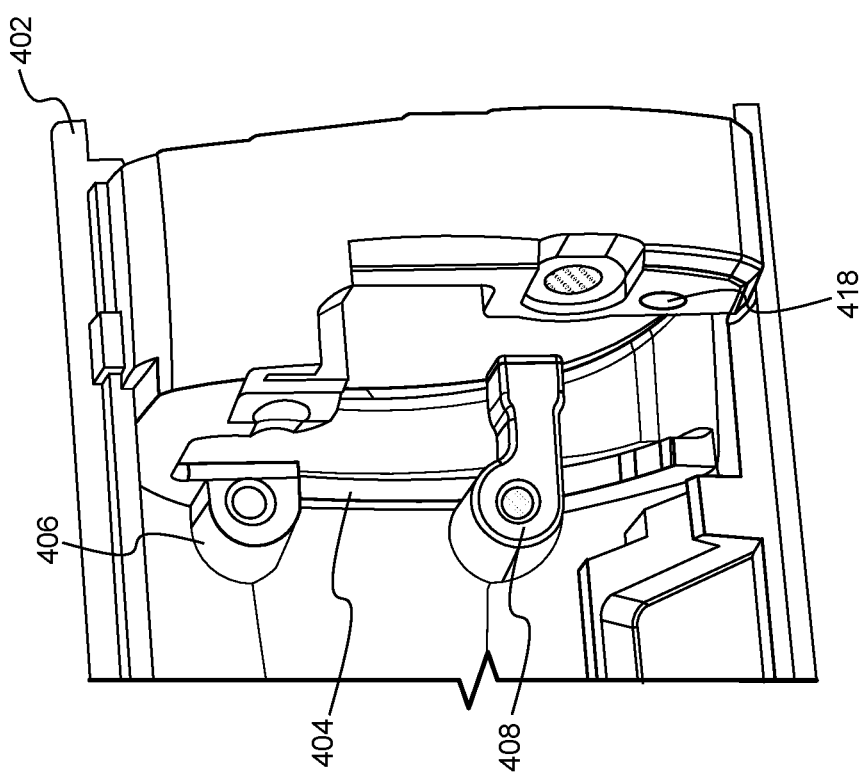
FIG. 4A illustrates a peripheral region of a frame of the extended reality device of FIG. 1 in accordance with an example of the present disclosure.

FIG. 4A illustrates a peripheral region of a frame 402 in accordance with an example of the present disclosure. Frame 402 may be partially hollow in order to accommodate electrical components, cables, a hinge assembly, or other components. Frame 402 may include a raised ridge 404 located at or near the peripheral region of the frame 402 and configured to abut at least a portion of wiper gasket 412. Raised ridge 404 may be configured to prevent stationary section 410 from sliding or moving past a certain point of an interior of the frame. In some examples, raised ridge 404 may surround a circumference of the peripheral region of the frame 402. In some examples, raised ridge 404 may partially surround the circumference of frame 402. In some examples, the raised ridge 404 may have a first side that abuts one or more portions of the wiper gasket 412 and a second side opposite the first side that does not contact the wiper gasket 412. In some examples, there may be multiple raised ridges disposed within a peripheral region of the frame 402. In some examples, the raised ridge 404 may be positioned within the frame 402 such that, during the application of a force to the frame 402 and/or temple, minimal compressive force is applied to the wiper gasket 412.

Frame 402 may include one or more internal mounts (e.g., internal mounts 406, 408) configured to couple and secure one or more portions of stationary section 410 to frame 402 either directly or indirectly. In some examples, the one or more internal mounts may be internal to the housing or disposed within a perimeter of the housing of the head-mounted device 100. One or more internal mounts may be integrally formed within frame 402 or fixedly coupled to frame 402. In some examples, one or more internal mounts may be associated with an extension arm or extend away from a wall of frame 402. For example, internal mounts 406 and 408 extend from an internal wall of frame 402. Internal mounts may have a cylindrical or substantially cylindrical exterior and/or interior surface. Internal mounts 406, 408 may be configured to accept a fastener, such as a screw, bolt, pin, rivet, or other fastening means for connecting parts of the hinge assembly to a frame or a temple. In some examples, one or more parts of the hinge assembly may be coupled to the frame and/or temple using adhesive in addition to or alternative to mechanical fasteners (e.g., screw, bolt, pin, rivet, etc.)

In some examples, internal mounts may be configured to abut other internal mounts. For example, internal mount 406 associated with frame 402 may be configured to abut internal mount 416 associated with stationary section 410 such that a fastener (e.g., a screw, bolt, pin, rivet, or other fastening means) may be used to couple the frame 402 and the stationary section 410. Internal mounts may be positioned within the frame and stationary section such that force applied on the frame 402 and/or temple is transferred to the one or more internal mounts thereby minimizing forces experienced by the wiper gasket 412. The internal mounts may be positioned within the frame and stationary section such that forces applied on the frame 402 and/or temple are maintained at as constant a level as possible and water ingress points can be avoided. In some examples, internal mounts (e.g., internal mount 416) may be configured and/or positioned within the frame and/or stationary section 410 in order to ensure that the stationary section 318 is properly aligned with the frame during assembly.

In some examples, a stationary guide opening 418 may be associated with frame 402. The stationary guide opening 418 may be configured to accept a stationary guide associated with the stationary section 410 (e.g., stationary guide 340 shown in FIG. 3) in order to ensure that the stationary section 410 is properly aligned with frame 402 during assembly.

FIG. 4B illustrates a wiper gasket 412 and stationary section 410 of a hinge assembly positioned in a peripheral region of frame 402 in accordance with an example of the present disclosure. Wiper gasket 412 and the inner housing of frame 402 may have dimensions such that the wiper gasket 412 and the stationary section 410 are prevented from being further slid within frame 402. For example, frame 402 may include a raised ridge 404 configured to abut at least a portion of wiper gasket 412. Raised ridge 404 may also be configured to abut one or more wiper gasket protrusions (in whole or in part) such as protrusions 414 as depicted in FIG. 4B. For example, raised ridge 404 may include a first side that abuts one or portions of the wiper gasket 412 and a second side opposite the first side that does not contact the wiper gasket 412. In some examples, raised ridge 404 may wrap around an inner circumference of frame 402.

Figure 5B:
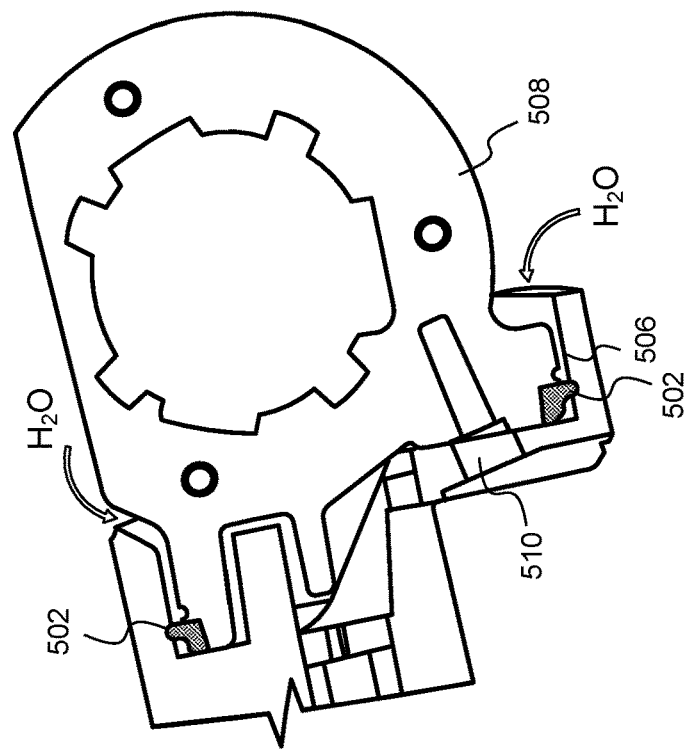
FIG. 5B illustrates a top, cross-sectional view of the hinge assembly taken along an interface between the stationary section of the hinge assembly and a rotary section of the hinge assembly, and showing the example wiper gasket disposed between the stationary section of the hinge assembly and the peripheral region of the frame, in accordance with an example of the present disclosure.
Figure 5A:
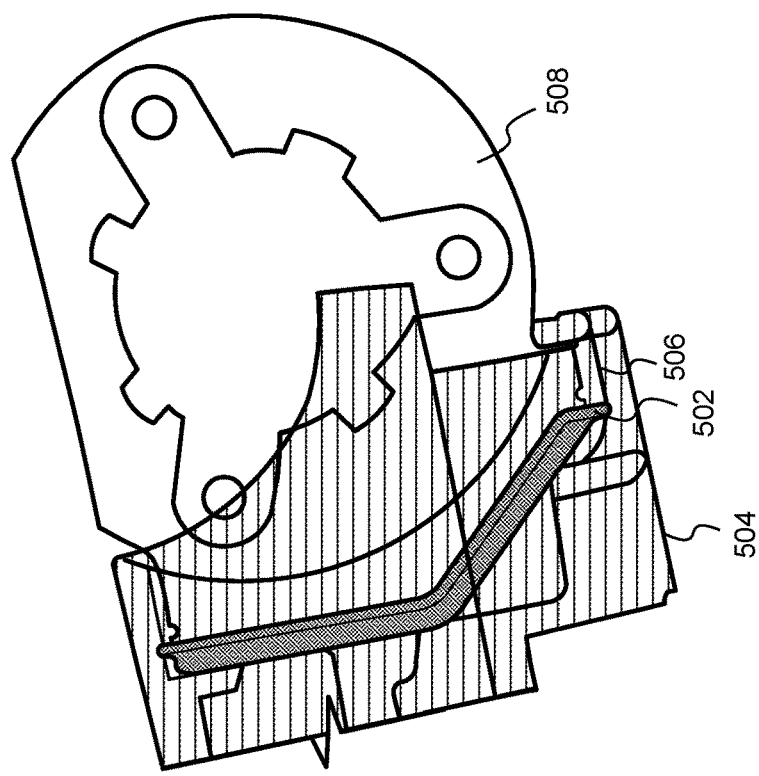
FIG. 5A illustrates a top view of the example wiper gasket interposed between the stationary section of the hinge assembly and the peripheral region of the frame, in accordance with an example of the present disclosure. In this figure, the frame is shown as being translucent so that the example wiper gasket and other internal features are visible.

FIG. 5A illustrates a top view of a wiper gasket 502 and a stationary section 508 of a hinge assembly positioned in a peripheral region 506 of a frame 504 (shown as being translucent in this figure to provide visibility to internal components) in accordance with an example of the present disclosure. As shown in FIG. 5A, the wiper gasket 502 includes a lip that protrudes radially outward and is biased radially outward to contact and seal against an inner surface of the peripheral region 506 of the frame 504 around a circumference of an opening in the frame 504. The wiper gasket 502 in this example has a non-planer profile such that a first portion of the wiper gasket 502 disposed in a first plane is configured to extend around a first portion of the inner edge of the frame 504, and a second portion of the wiper gasket 502 disposed in a second plane spaced from the first plane is configured to extend around a second (remaining) portion of the inner edge of the frame 504. The first plane and the second plane may, but need not necessarily, be substantially parallel to one another. The wiper gasket 502 extends around the edge of the frame 504 so as to seal around an entire perimeter of the frame 504.

FIG. 5B illustrates a top view cross section of a wiper gasket 502 and a stationary section 508 of a hinge assembly positioned in a peripheral region 506 of a frame in accordance with an example of the present disclosure. Internal mount 510 may be configured to couple frame 504 to stationary section 508 of a hinge assembly via a fastener (e.g., a screw, bolt, pin, rivet, or other fastening means). As shown in FIG. 5B, wiper gasket 502 may help prevent water from entering frame 504 by creating a seal around an inner peripheral edge or region of frame 504.

Figure 6:
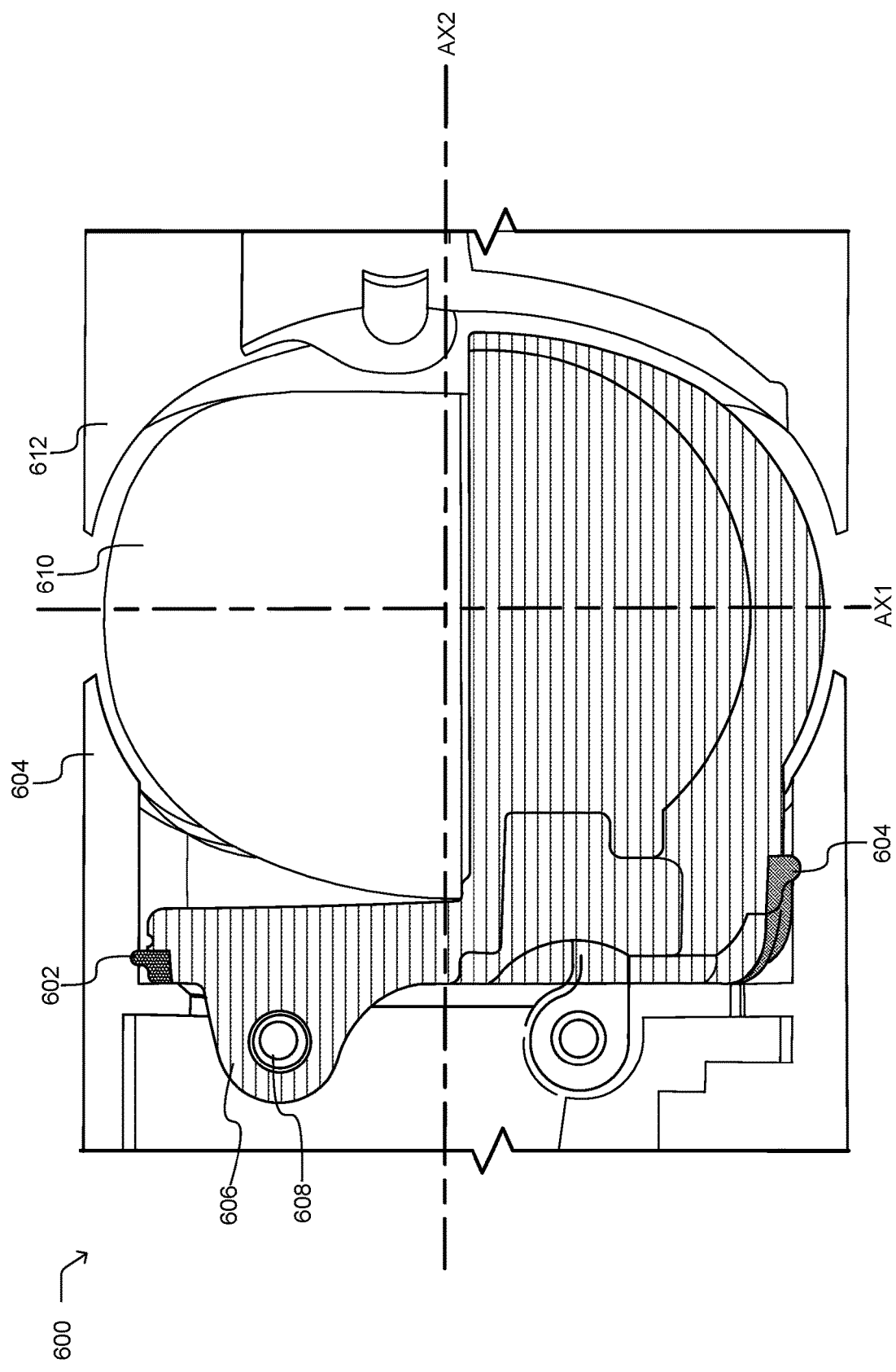
FIG. 6 illustrates a side, cross-sectional view of the example hinge assembly in accordance with an example of the present disclosure.

FIG. 6 illustrates a side view cross section of an example hinge assembly 600 when the hinge assembly 600 is positioned in the peripheral region of frame 604 in accordance with an example of the present disclosure. Hinge assembly 600 may include a stationary section 606 and a rotary section 610 that is rotatable with respect to stationary section 606 about a rotational axis AX1. In some examples, stationary section 606 may be coupled to frame 604 and rotary section 610 may be coupled (indirectly or directly) to a corresponding temple. For example, stationary section 606 may be fastened, bonded, and/or otherwise fixedly secured to frame 604 at least in part via internal mount 608 such that the position and orientation of stationary section 606 is maintained relative to frame 604 during rotation of rotary section 610 and temple 612. Additionally, rotary section 610 may be fastened, bonded, and/or otherwise fixedly secured to temple 612 so that rotary section 610 is rotated in conjunction with temple 612. In some examples, rotary section 610 may include a rotary cover and stationary section 606 may include a stationary cover.

Wiper gasket 602 may be positioned between an inner peripheral section of frame 604 and stationary section 606 of hinge assembly 600. For example, wiper gasket 602 may be positioned to engage a peripheral surface of stationary section 606 and extend around an inner peripheral edge of frame 604 in order to provide ingress protection from moisture or dust. In some examples, the wiper gasket 602 may be coupled to a peripheral surface of stationary section 606 and/or an inner peripheral section of frame 604 using, for example, tape, glue, epoxy, or the like. In some examples, wiper gasket 602 may be held in place between the stationary section 606 and frame 604 at least in part by a compressive force from internal mount 608. The wiper gasket 602 may help prevent the hinge assembly 600 from wiggling inside the frame 604 when pressure is applied to the temple 612 or frame 604.

In some examples, a second wiper gasket (not shown) may be overmolded onto stationary section 606 in order to provide additional ingress protection. In some examples, a second wiper gasket may be positioned between wiper gasket 602 and one or more internal parts of frame 604. In some examples, a second wiper gasket may be positioned between a raised ridge (e.g., raised ridge 404) located within frame 604 and one or more internal parts of frame 604. For example, a first wiper gasket (e.g., wiper gasket 602) may be positioned between a first side of a raised ridge and stationary section 606 while a second wiper gasket may be positioned between a second side of the raised ridge opposite the first side and one or more internal parts of frame 604.

In some examples, a second wiper gasket (not shown) may be positioned between rotary section 610 and an inner peripheral edge or section of temple 612. The second wiper gasket may be positioned between the rotary section 610 and temple 612 so that moisture and/or dust is prevented from entering a hollow or partially hollow temple and damaging electrical components and/or cables found in temple 612. In some examples, one or more portions of the second wiper gasket may be configured to abut a surface or portion of the rotary section 610.

CONCLUSION

Although the discussion above sets forth example implementations of the described techniques and structural features, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims. For example, the structural features and/or methodological acts may be rearranged and/or combined with each other and/or other structural features and/or methodological acts. In various examples, one or more of the structural features and/or methodological acts may be omitted.

What is claimed is:

1. A head-mounted device comprising:
    a hollow frame including an inner peripheral edge defined within a peripheral region of the hollow frame;
    a temple extending from the peripheral region of the hollow frame;
    a hinge assembly coupling the temple to the hollow frame, the hinge assembly comprising:
        a stationary section coupled to the hollow frame; and
        a rotary section coupled to the temple and rotatable with respect to the stationary section about a rotational axis; and
    a wiper gasket configured to engage a peripheral surface of the stationary section and extend around the inner peripheral edge of the hollow frame to seal the head-mounted device.

2. The head-mounted device of claim 1, wherein the stationary section is coupled to the hollow frame via one or more internal mounts such that force applied on the hollow frame is transferred to the one or more internal mounts.

3. The head-mounted device of claim 1, wherein the wiper gasket has a stepped profile including a first step and a second step, wherein the first step is configured to engage and seal against the inner peripheral edge of the hollow frame.

4. The head-mounted device of claim 1, wherein the inner peripheral edge of the hollow frame includes a recessed portion that is recessed relative to the inner peripheral edge and configured to receive a portion of the wiper gasket.

5. The head-mounted device of claim 1, wherein the wiper gasket includes a protrusion that extends from a side of the wiper gasket and is configured to direct an accurate placement of the wiper gasket between the stationary section and the hollow frame.

6. The head-mounted device of claim 1, wherein the stationary section includes a mounting region including a first mounting portion and a second mounting portion opposite the first mounting portion, wherein the first mounting portion extends in a first direction and the second mounting portion extends in a second direction opposite the first direction.

7. The head-mounted device of claim 1, wherein the stationary section includes a mounting region including a first portion and a second portion opposite the first portion, wherein the first portion is disposed on a first plane and the second portion is disposed in a second plane offset from the first plane.

8. The head-mounted device of claim 1, wherein the wiper gasket has a non-planar profile such that a first portion of the wiper gasket is on a first plane and a second portion opposite the first portion is on a second plane parallel to the first plane and offset from the first plane.

9. The head-mounted device of claim 1, wherein the wiper gasket is a first wiper gasket, the head-mounted device further comprising a second wiper gasket configured to extend around an inner peripheral surface of the temple.

10. A hinge assembly comprising:
a stationary section coupled to a frame via one or more internal mounts;
a rotary section that is rotatable with respect to the stationary section about a rotational axis; and
a wiper gasket configured to engage a peripheral surface of the stationary section and extend around an inner peripheral edge of the frame.

11. The hinge assembly of claim 10, wherein the stationary section is coupled to the frame via one or more internal mounts such that force applied on the frame is transferred to the one or more internal mounts.

12. The hinge assembly of claim 10, wherein the wiper gasket has a stepped profile including a first step and a second step, wherein the first step is configured to engage and seal against the inner peripheral edge of the frame.

13. The hinge assembly of claim 10, wherein the inner peripheral edge of the frame includes a recessed portion that is recessed relative to the inner peripheral edge and configured to receive a portion of the wiper gasket.

14. The hinge assembly of claim 10, wherein the wiper gasket includes a protrusion that extends from a side of the wiper gasket and is configured at least in part to direct placement of the wiper gasket between the stationary section and the frame.

15. The hinge assembly of claim 10, wherein the stationary section includes a mounting region including a first mounting portion disposed in a first plane and a second mounting portion disposed in a second plane offset from the first plane, and the wiper gasket engages the stationary section at the first mounting portion and the second mounting portion of the mounting region.

16. The hinge assembly of claim 10, wherein the wiper gasket has a non-planar profile such that a first portion of the wiper gasket is on a first plane that is perpendicular to a longitudinal axis of a temple coupled to the frame via the hinge assembly, and a second portion of the wiper gasket is on a second plane substantially parallel to the first plane.

17. The hinge assembly of claim 10, wherein a first portion of the wiper gasket is configured to extend around the inner peripheral edge of the frame on a first plane and a second portion opposite the first portion is configured to extend around the inner peripheral edge of the frame on a second plane parallel to the first plane.

18. A wiper gasket comprising:
a first step extending around an outer surface of the wiper gasket and configured to engage a peripheral surface of a first component;
a second step proximate the first step, the second step partially extending around the outer surface of the wiper gasket; and
an inner surface of the wiper gasket configured to engage a mounting region of a second component;
wherein the wiper gasket has a non-planar profile such that a first portion of the wiper gasket is disposed in a first plane and extends in a first direction and a second portion opposite the first portion is disposed in a second plane offset from the first plane and extends in a second direction opposite the first direction.

19. The wiper gasket of claim 18, wherein the wiper gasket further includes a middle portion connecting the first portion and the second portion and the second step gradually tapers in the middle portion between the first portion and the second portion.

20. The wiper gasket of claim 18, wherein the wiper gasket includes a protrusion that extends from a side of the wiper gasket and is configured to direct placement of the wiper gasket between the first component and the second component.

* * * * *